US012647667B2

(12) United States Patent
Jung et al.

(10) Patent No.: US 12,647,667 B2
(45) Date of Patent: Jun. 2, 2026

(54) CAMERA APPARATUS

(71) Applicant: Hanwha Vision Co., Ltd., Seongnam-si (KR)

(72) Inventors: Woon Do Jung, Seongnam-si (KR); Byeong Ho Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 85 days.

(21) Appl. No.: 18/652,233

(22) Filed: May 1, 2024

(65) Prior Publication Data

US 2024/0373113 A1 Nov. 7, 2024

(30) Foreign Application Priority Data

May 4, 2023 (KR) ........................ 10-2023-0058498

(51) Int. Cl.

| | |
|---|---|
| ***H04N 23/56*** | (2023.01) |
| ***H04N 23/11*** | (2023.01) |
| ***H04N 23/50*** | (2023.01) |
| ***H04N 23/52*** | (2023.01) |
| ***H04N 23/55*** | (2023.01) |

(52) U.S. Cl.

CPC ............. *H04N 23/56* (2023.01); *H04N 23/11* (2023.01); *H04N 23/52* (2023.01); *H04N 23/55* (2023.01)

(58) Field of Classification Search

CPC .. H04N 23/50; H04N 23/51; H04N 23/54-57; H04M 1/0264

See application file for complete search history.

(56) References Cited

U.S. PATENT DOCUMENTS

| | | | | |
|---|---|---|---|---|
| 2011/0050986 A1* | 3/2011 | Wang | G06F 1/1686 | 348/E5.022 |
| 2012/0092549 A1* | 4/2012 | Hsu | G03B 15/03 | 348/374 |
| 2014/0160300 A1* | 6/2014 | Hung | H04N 23/56 | 348/164 |
| 2024/0205320 A1* | 6/2024 | Yan | H04M 1/026 | |

FOREIGN PATENT DOCUMENTS

| | | | | |
|---|---|---|---|---|
| JP | 2016-171026 A | | 9/2016 | |
| KR | 20-20020017008 | * | 6/2002 | |
| KR | 200286962 Y1 | * | 8/2002 | H04N 23/51 |
| KR | 10-0736446 B1 | | 7/2007 | |
| KR | 10-2010-0130703 | * | 4/2011 | H04N 7/18 |
| KR | 101032984 B1 | * | 5/2011 | H04N 23/51 |
| KR | 10-1173542 B1 | | 8/2012 | |
| KR | 10-2126870 B1 | | 6/2020 | |
| WO | WO-2021149990 A1 | * | 7/2021 | G09G 3/2003 |

* cited by examiner

*Primary Examiner* — Anthony J Daniels
(74) *Attorney, Agent, or Firm* — Sughrue Mion, PLLC

(57) ABSTRACT

A camera apparatus includes a housing, a lens included in the housing, a plurality of light sources arranged around the lens, an illuminance sensor, a first cover covering an end of the lens, a first window mounted on the first cover corresponding to the lens, and a second window mounted on the first cover corresponding to the illuminance sensor.

20 Claims, 8 Drawing Sheets

OUTER SIDE ⇦ ⇨ INNER SIDE

CAMERA APPARATUS

CROSS-REFERENCE TO RELATED APPLICATION

This application claims priority from Korean Patent Application No. 10-2023-0058498 filed on May 4, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a camera apparatus.

2. Description of Related Art

In addition to a housing, a lens located in the housing, and a window covering the lens, a camera apparatus may further include an infrared light source to improve photographing performance during nighttime. The camera apparatus including the infrared light source may also include an illuminance sensor for detecting an ambient illuminance and may determine whether to operate the infrared light source based on the ambient illuminance detected by the illuminance sensor and may switch to and from a day screen mode and a night screen mode.

In the camera apparatus, the infrared light source is covered with a cover formed of a material that blocks visible light and transmits only infrared light to prevent the infrared light source from being exposed to the outside. On the other hand, because the illuminance sensor should receive visible light unlike the infrared light source, the illuminance sensor is located on a front surface of the cover, and a window is large in order to cover the illuminance sensor.

Therefore, there is a demand for a camera apparatus having a reduced size of each window covering the lens such that the angle of view of the lens is not exceeded.

SUMMARY

To address the aforementioned problem, provided is a camera apparatus having a reduced size of each window and an overall reduced size thereof by configuring a window covering a lens and a window covering an illuminance sensor as separate members. According to an aspect of the disclosure, a camera apparatus includes a housing, a lens included in the housing, a plurality of light sources arranged around the lens, and an illuminance sensor, a first cover covering an end of the lens, a first window mounted on the first cover corresponding to the lens, and a second window mounted on the first cover corresponding to the illuminance sensor.

The first window and the second window may be separate and spaced apart from each other on a front surface of the first cover.

The first cover may include a first opening located in the center of the first cover, the first opening may have a diameter greater than a diameter of the lens, and may be configured to allow the first window to be mounted therein, and an insertion hole located outside the first opening in a radial direction of the first cover and may be configured to allow the second window to be mounted therein.

The second window may include a mounting flange protruding along an outer circumferential surface of the second window, and the insertion hole may include an insertion flange protruding along an inner circumferential surface of the insertion hole. In a state where the second window is inserted into the insertion hole, a front surface of the first cover may protrude, in the forward direction, to a front surface of the second window or beyond the front surface of the second window.

The plurality of light sources and the illuminance sensor may be arranged outside the first window in a radial direction.

The camera apparatus may further include a support substrate mounted on an outer circumferential surface of the lens and may be configured to allow the plurality of light sources and the illuminance sensor to be mounted thereon, and a second cover mounted on the first cover, located closer to the center of the first cover than the plurality of light sources in the radial direction of the first cover, and including a second opening in which the first window is mounted.

The support substrate may be spaced apart in a longitudinal direction of the housing from an inner end of the first cover and an inner end of the second cover.

The first cover may further include a first inner flange protruding along an inner circumferential surface of the first opening and may be configured to support the second cover, an insertion flange protruding along an inner circumferential surface of the insertion hole and may be configured to support the second window, and a first outer flange protruding along an outer circumferential surface of the first cover and contacting an end of the housing.

The second cover may further include a second outer flange supported by the first inner flange and protruding along an outer circumferential surface of the second cover, a second inner flange protruding along an inner circumferential surface of the second opening, and a support flange located behind the second inner flange, protruding along the inner circumferential surface of the second opening, and configured to support an outer circumferential surface of the second window.

The first cover may be configured to block visible light and transmit infrared light, and the second cover may be configured to block visible light and infrared light.

A diameter of the first window may correspond to an angle of view of the lens, wherein the first window is offset from the second window.

The first window may include at least one of glass, polycarbonate (PC), or polymethyl methacrylate (PMMA).

The second window may include at least one of PC, PMMA, or acrylonitrile butadiene styrene copolymer (ABS) resin.

The first window and the second window may include different materials.

The first window may include optical glass, and the second window may include injection plastic.

The first window may be configured to transmit visible light and infrared light.

The second window may be configured to transmit visible light and infrared light or configured to transmit only visible light and block infrared light.

The illuminance sensor may be located between the plurality of light sources.

The first cover and the first window may be arranged concentrically, the first cover may have a diameter greater than a diameter of the first window, and the plurality of light sources may be located in a circular formation between the first cover and the first window.

According to another aspect of the disclosure, a camera apparatus includes a housing, a lens included in the housing, a support substrate connected to the lens, a plurality of infrared light sources mounted on a front surface of the support substrate and arranged around the lens, an illuminance sensor mounted on the front surface of the support substrate and located between the plurality of infrared light sources, a first cover covering an end of the lens, including a first opening in a center thereof and an insertion hole at a position spaced apart from the first opening in a radial direction, the first cover may be configured to block visible light and transmit infrared light, a first window mounted in the first opening corresponding to the lens and offset from the plurality of infrared light sources, the first window may be configured to transmit visible light and infrared light, a second window mounted in the insertion hole corresponding to the illuminance sensor, formed of a material different from a material of the first window, the second window may be configured to transmit visible light and infrared light or configured to transmit only visible light and block infrared light, and a second cover mounted on the first cover, located closer to the center of the first cover than the plurality of infrared light sources in a radial direction of the first cover, the second cover may be configured to support the first window and block visible light and infrared light.

BRIEF DESCRIPTION OF DRAWINGS

The above and other aspects, features, and advantages of certain embodiments will become more apparent from the following description taken in conjunction with the accompanying drawings, in which.

DETAILED DESCRIPTION

Figure 1:
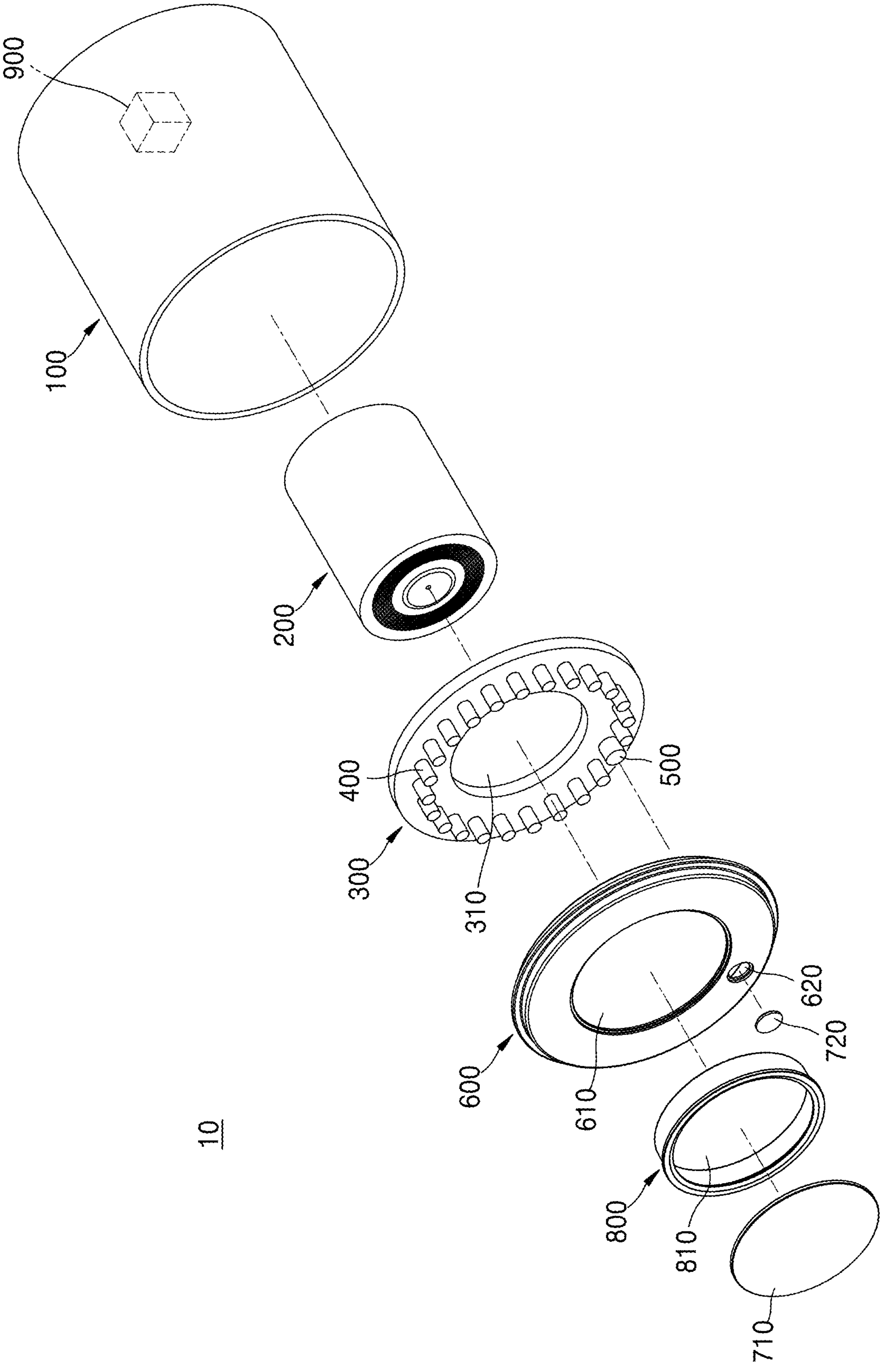
FIG. 1 is an exploded perspective view illustrating a camera apparatus according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Further, each of the features of the various embodiments of the present disclosure may be combined or combined with each other, in part or in whole, and various interlocking and driving are possible. Each embodiment may be implemented independently of each other or may be implemented together in an association. Unless otherwise defined, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as “beneath,” “below,” “lower,” “lower side,” “under,” “above,” “upper,” “upper side,” and the like, may be used herein for ease of explanation to describe one element or feature’s relationship to one or more other elements or features as illustrated in the figures. It will be understood that the spatially relative terms are intended to encompass different orientations of the device in use or in operation, in addition to the orientation depicted in the figures. For example, if the device in the figures is turned over, elements described as “below,” “beneath,” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. Similarly, when a first part is described as being arranged “on” a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected," "directly coupled," or "directly on," refers to one component directly connecting or coupling another component, or being on another component, without an intermediate component. In addition, in the present disclosure, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this disclosure, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present disclosure, and should not be interpreted in an idealized or overly formal sense, unless expressly so defined herein.

Figure 2:
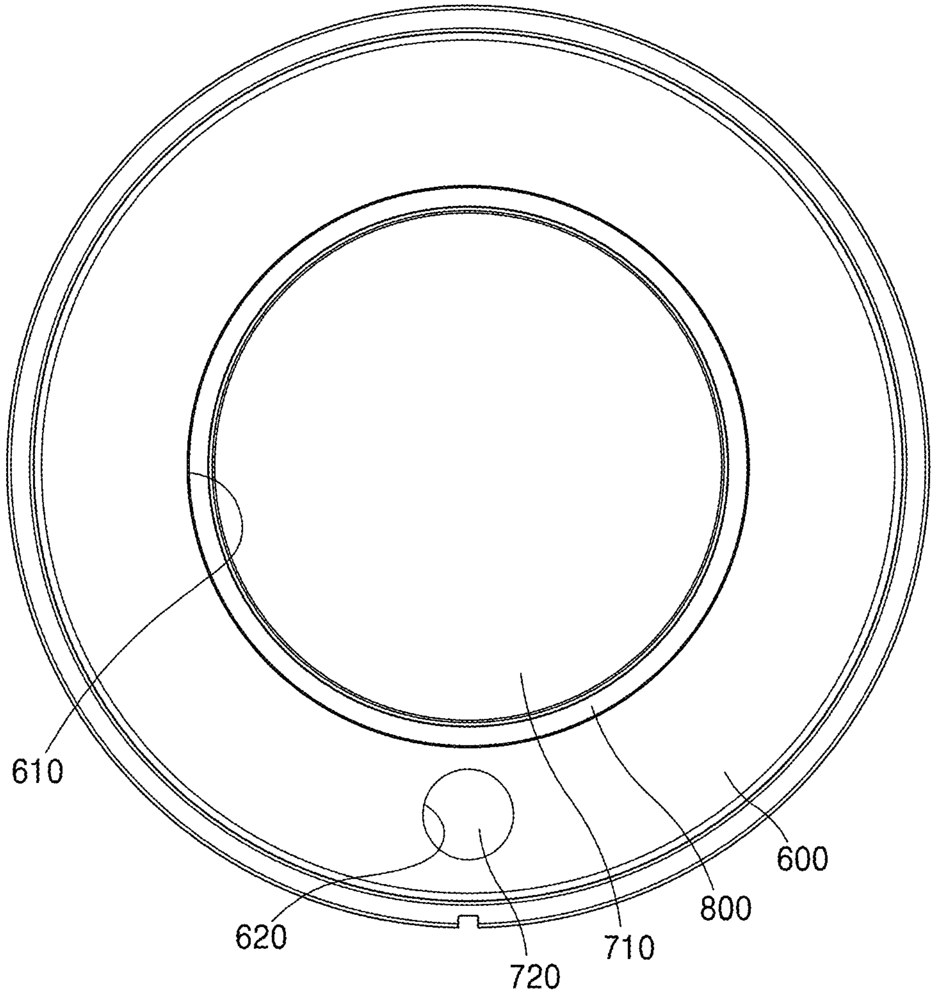
FIG. 2 is a front view illustrating a part of the camera apparatus according to one or more embodiments.
Figure 3:
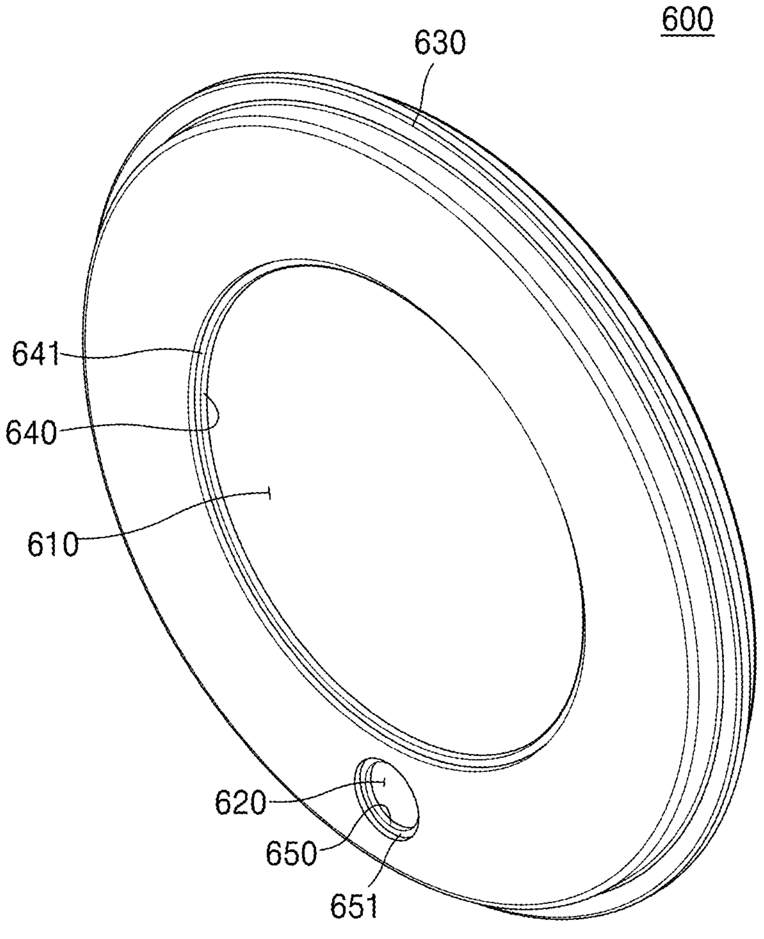
FIG. 3 illustrates a first cover according to one or more embodiments.
Figure 4:
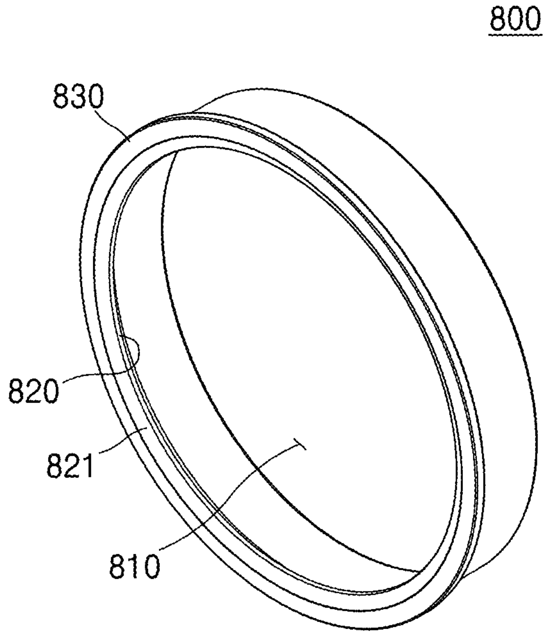
FIG. 4 illustrates a second cover according to one or more embodiments.
Figure 5:
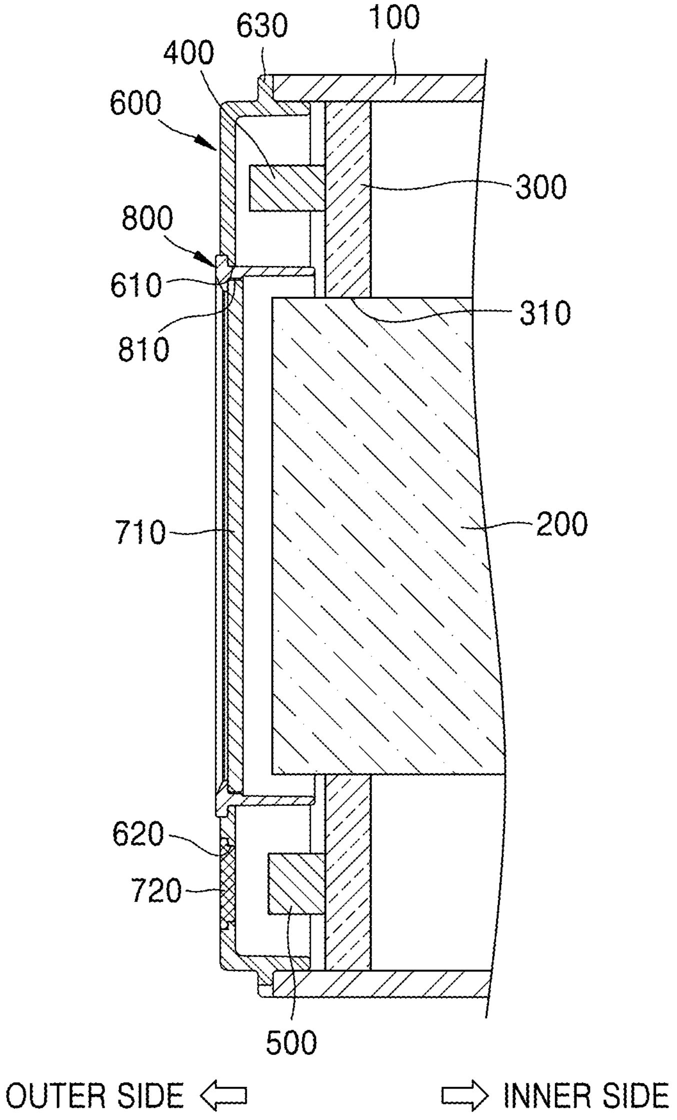
FIG. 5 is a cross-sectional view illustrating a part of the camera apparatus according to one or more embodiments.
Figure 6:
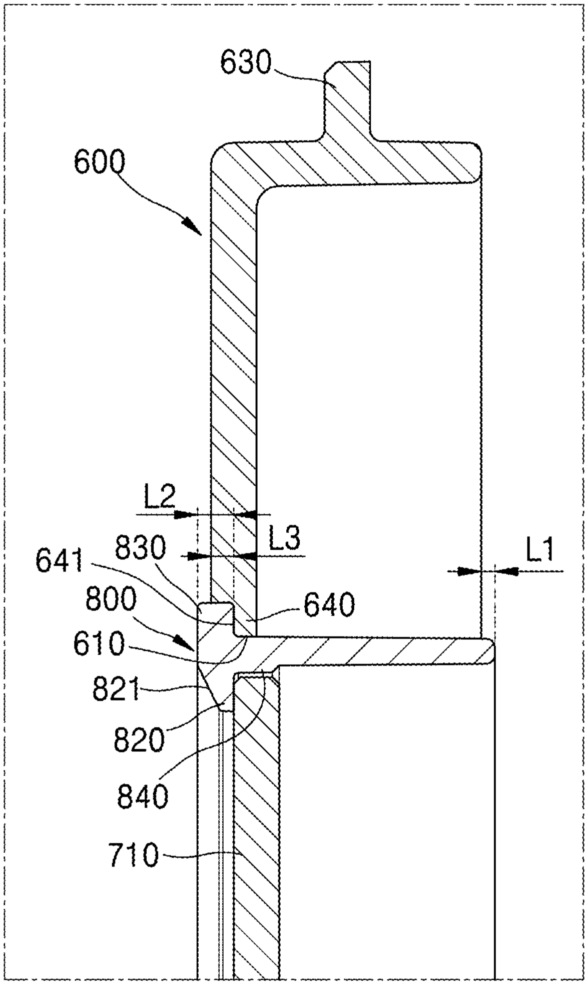
FIG. 6 is an enlarged view illustrating a part of FIG. 5.
Figure 7:
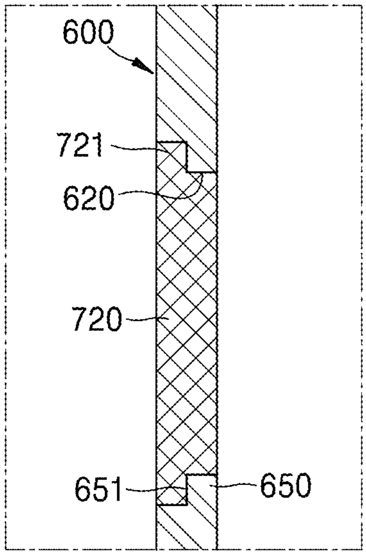
FIG. 7 is an enlarged view illustrating another part of FIG. 5.

FIG. 1 is an exploded perspective view illustrating a camera apparatus 10 according to one or more embodiments. FIG. 2 is a front view illustrating a part of the camera apparatus 10 according to one or more embodiments. FIG. 3 illustrates a first cover 600 according to one or more embodiments. FIG. 4 illustrates a second cover 800 according to one or more embodiments. FIG. 5 is a cross-sectional view illustrating a part of the camera apparatus 10 according to one or more embodiments. FIG. 6 is an enlarged view illustrating a part of FIG. 5. In more detail, for convenience of explanation, FIG. 6 is an enlarged view illustrating a portion of FIG. 5 excluding a lens 200, a support substrate 300, and a light source 400. FIG. 7 is an enlarged view illustrating another part of FIG. 5. In more particular, for convenience of explanation, FIG. 7 is an enlarged view illustrating a portion of FIG. 5 excluding an illuminance sensor 500.

Referring to FIGS. 1 through 7, the camera apparatus 10 may be used to detect an object or a person and capture an image of the object or the person. According to one or more embodiments, the camera apparatus 10 may be a camera for recognizing a vehicle license plate number, a thermal imaging camera, or a flame detection camera. Although the camera apparatus 10 has a substantially cylindrical shape in FIG. 1, a shape of the camera apparatus 10 is not limited thereto. According to one or more embodiments, the camera apparatus 10 may be a bullet-shaped camera, a pan-tilt-zoom (PTZ) camera, or a dome camera attached to a wall or ceiling through a support. According to one or more embodiments, the camera apparatus 10 may be a day/night camera apparatus capable of detecting both visible light and infrared light.

The camera apparatus 10 may include a housing 100, a lens 200, a support substrate 300, a light source 400, a illuminance sensor 500, a first cover 600, a first window 710, a second window 720, a second cover 800, and a controller 900.

For example, the camera apparatus 10 including the housing 100, the lens 200 included in the housing 100, a plurality of light sources 400 arranged around the lens 200, and the illuminance sensor 500 may further include the first cover 600 covering an end of the lens 200, the first window 710 mounted on the first cover 600 to correspond to the lens 200, and the second window 720 mounted on the first cover 600 to correspond to the illuminance sensor 500.

For example, the camera apparatus 10 may include the housing 100, the lens 200 included in the housing 100, the support substrate 300 connected to the lens 200, a plurality of infrared light sources 400 mounted on a front surface of the support substrate 300. The plurality of infrared light sources 400 may be arranged around the lens 20. The camera apparatus 10 may include the illuminance sensor 500 mounted on the front surface of the support substrate 300 and located between the plurality of infrared light sources 400. The camera apparatus 10 may include the first cover 600 covering an end of the lens 200. The first cover 600 may include a first opening 610 in the center and a second opening 620 at a position spaced apart from the first opening 610 in a radial direction, and may be configured to block visible light and transmit infrared light. The camera apparatus 10 may include the first window 710 mounted in the first opening 610 to correspond to the lens 200, not overlapping the plurality of infrared light sources 400, and the first window 710 may be configured to transmit visible light and infrared light. The camera apparatus 10 may include the second window 720 mounted in the insertion hole 620 to correspond to the illuminance sensor 500, formed of a material different from a material of the first window 710, and the second window 720 may be configured to transmit visible light and infrared light or configured to transmit only visible light and block infrared light. The camera apparatus 10 may include the second cover 800 mounted on the first cover 600, located closer to the center of the first cover than the plurality of infrared light sources 400 in a radial direction of the first cover 600, supporting the first window 710, and the second cover 800 may be configured to block visible light and infrared light.

The housing 100 may have an inner space including other elements of the camera apparatus 10 (e.g., the lens 200, the support substrate 300, the light source 400, the illuminance sensor 500, the first cover 600, the first window 710, the second window 720, the second cover 800, and a controller 900) and may hold and support the other elements of the camera apparatus 10. For example, the housing 100 may have a cylindrical shape with an empty interior. Alternatively, the housing 100 may have a polyhedral shape such as a rectangular parallelepiped shape, a hemispherical shape, or a bullet shape. For convenience of explanation, the following will be described in which that the housing 100 has a cylindrical shape as shown in FIG. 1.

The housing 100 may include a wiring connected to an external device or an external power source. To this end, the housing 100 may have both ends open in one direction (e.g., a longitudinal direction of the housing 100) or may have one or more holes in at least a part thereof.

Inside the housing 100, the lens 200 may be coaxial with the housing 100 or the lens 200 may be spaced apart from the central axis of the housing 100. The support substrate 300 may be included in the housing 100 to surround the lens 200. An outer end of the lens 200 (e.g., an end in a longitudinal direction of the camera apparatus 10 or a left side of FIG. 5) may be aligned with an outer end of the housing 100 or may be located at a more inner position or outer position than the outer end of the housing 100. The first cover 600 may be mounted on the outer end of the housing 100, and the first cover 600 may protrude further outward beyond the outer end of the housing 100. The outer end of the housing 100 may define an area where there are the plurality of light sources 400 and the illuminance sensor 500 are located, along with an inner area between the support substrate 300 and the first cover 600. The plurality of light sources 400 and the illuminance sensor 500 mounted on the support substrate 300 may protrude further outward beyond the outer end of the housing 100 or may be located inside the outer end of the housing 100. The second cover 800 may be mounted inside the first cover 600, and the second cover 800 may protrude further outward beyond the outer end of the housing 100.

The lens 200 may be located on one side of the housing 100 and may capture an image of an object or a person around the camera apparatus 10. For example, the lens 200 may detect visible light during the day or when the light source 400 is not operating, and may detect infrared light at night or when the light source 400 is operating. The lens 200 may perform a zoom operation. Although one lens 200 is illustrated in FIG. 1, the number of lenses 200 may be two or more. For example, a plurality of lenses 200 may be arranged to be symmetrical to each other with respect to the central axis of the housing 100.

The support substrate 300 may be located inside the housing 100 and the plurality of light sources 400 and the illuminance sensor 500 may be mounted on the support substrate 300. For example, as shown in FIG. 1, the support substrate 300 may have an annular shape having a mounting hole 310 in the center. The lens 200 may be inserted into the mounting hole 310 of the support substrate 300 so that the support substrate 300 surrounds the lens 200. The support substrate 300 may be connected to the controller 900 and the external power source so that the plurality of light sources 400 and the illuminance sensor 500 mounted on the support substrate 300 are controlled by the controller 900. The support substrate 300 may be a printed circuit board (PCB). The support substrate 300 may be coaxial with at least one of the housing 100, the lens 200, the first cover 600, and the second cover 800.

The support substrate 300 may be located at a more rear position (or a more inner position, such as, a more right position of FIG. 5) of the camera apparatus 10 than the outer end of the housing 100. Also, the support substrate 300 may be spaced apart from an inner end of the first cover 600 and an inner end of the second cover 800. Accordingly, a sufficient space where the plurality of light sources 400 and the illuminance sensor 500 are mounted on the support substrate 300 may be secured, and the plurality of light sources 400 and the illuminance sensor 500 may not interfere with the first cover 600 and the second cover 800.

For example, the lens 200 may be inserted into the mounting hole 310 of the substrate 300 or may be coupled to the mounting hole 310 of the support substrate 300 with an adhesive or bolts.

The light source 400 may be arranged around the lens 200. For example, as shown in FIG. 1, the light source 400 may include a plurality of light sources 400, and the plurality of light sources 400 may be mounted on one surface of the support substrate 300 in a circumferential direction at equal or different intervals. An imaginary line connecting the plurality of light sources 400 may form a concentric circle with the support substrate 300.

The light source 400 may be an infrared light source. When the illuminance sensor 500 detects an ambient illuminance of the camera apparatus 10 and transmits the illuminance to the controller 900 and the detected illuminance is equal to or less than a reference illuminance, the controller 900 may operate some or all of the plurality of light sources 400. Alternatively, when the detected illuminance exceeds the reference illuminance, the controller 900 may terminate operations of some or all of the plurality of light sources 400. Light emitted from the plurality of light sources 400 may pass through the first cover 600, be reflected from a subject, and then be transmitted to the lens 200.

The light source 400 may be located at a more outer position than the first opening 610 of the first cover 600 in a radial direction of the housing 100 (e.g., in a vertical direction of FIG. 5). For example, as shown in FIG. 1, the support substrate 300 on which the light source 400 is mounted may be coaxial with the first cover 600. Also, a mounting surface of the support substrate 300 may be located outside the first opening 610 of the first cover 600 in the radial direction in a plan view. For example, the light source 400 may be an infrared light source. In a state where the camera apparatus 10 is assembled, when viewed from the front, the plurality of light sources 400 may be located outside the first opening 610 and may overlap the first cover 600. Accordingly, external visible light is blocked by the first cover 600 and is not incident on the light source 400, and infrared light emitted to the light source 400 may pass through the first cover 600.

The light source 400 may be located at a more outer position than the second cover 800 in the radial direction of the housing 100. For example, as shown in FIG. 1, the second cover 800 may be inserted into the first opening 610 of the first cover 600, and the second cover 800 may surround an end of the lens 200. Accordingly, as shown in FIG. 5, in a state where camera apparatus 10 is assembled, the light source 400 may be located outside the second cover 800, and light emitted from the light source 400 may be blocked by the second cover 800 so as not to be directly emitted to the lens 200. In a state where the light source 400 is mounted on the support substrate 300, a front end (outer end) may be spaced apart from an inner surface of the first cover 600.

The light source 400 may form a plurality of rows. For example, in FIG. 1, the plurality of light sources 400 are arranged in a row so that an imaginary line connecting the plurality of light sources 400 forms one circle in FIG. 1. According to one or more embodiments, the plurality of light sources 400 may form a plurality of concentric circles. The number of light sources 400 is not particularly limited and may be appropriately selected according to specifications of the camera apparatus 10.

The illuminance sensor 500 may be mounted on one surface of the support substrate 300 and may be configured to detect an ambient illuminance of the camera apparatus 10 and transmit the ambient illuminance to the controller 900. For example, as shown in FIG. 1, the illuminance sensor 500 may be located between the plurality of light sources 400. Also, the illuminance sensor 500 may be located at a more outer position than the first opening 610 of the first cover 600 in the radial direction. The illuminance sensor 500 may be mounted on the support substrate 300 to correspond to the insertion hole 620 of the first cover 600. External visible light may be incident on the illuminance sensor 500 through the insertion hole 620 and the second window 720 inserted into the insertion hole 620, and the illuminance sensor 500 may detect an ambient illuminance of the camera apparatus 10. In a state where the illuminance sensor 500 is mounted on the support substrate 300, a front end (outer end) may be spaced apart from an inner surface of the second window 720 (e.g., in the longitudinal direction of the housing 100 or a left-right direction of FIG. 5).

The first cover 600 is formed of a material that blocks visible light and transmits infrared light. The first cover 600 may cover an end of the lens 200 in front of the light source 400. For example, as shown in FIG. 1, the first cover 600 may have an annular shape including the first opening 610 in the center. The first cover 600 may be mounted on the outer end of the housing 100 (e.g., an end in the longitudinal direction of the housing 100 or a left end of FIG. 5) and may cover the plurality of light sources 400. The first cover 600 may be coaxial with the housing 100 or the lens 200, and the inner end of the first cover 600 may be inserted into the housing 100 or may be coupled to the housing 100 through an adhesive or bolts.

The first cover 600 may be spaced apart from the end of the lens 200 so that the lens 200 corresponds to the first opening 610, and the second cover 800 may be mounted in the first opening 610. A diameter of the first opening 610 may be equal to or greater than a diameter of the lens 200. The first opening 610 may be coaxial with the central axis of the first cover 600.

The first cover 600 may be concentrically arranged with the first window 710. For example, the first cover 600 and the first window 710 may be coaxial with each other. Also, outlines of the first cover 600 and the first window 710 may form concentric circles. The first cover 600 may have a diameter greater than that of the first window 710. An imaginary line extending form the plurality of light sources 400 may be located between the first cover 600 and the first window 710. For example, an imaginary line connecting the plurality of light sources 400 may form a circle and may have a diameter less than that of the first cover 600 and greater than that of the first window 710.

The insertion hole 620 may be formed in the first cover 600 to correspond to the illuminance sensor 500. For example, as shown in FIGS. 1 and 2, the insertion hole 620 may be spaced apart from the first opening 610 in the radial direction and the second window 720 may be inserted into the insertion hole 620. Although the insertion hole 620 is formed under the first opening 610 in FIGS. 1 and 2, a position of the insertion hole 620 is not particularly limited. A specific position of the insertion hole 620 may be appropriately selected according to a position of the illuminance sensor 500 as long as the insertion hole 620 is spaced apart (separated) from the first opening 610 and the first window 710 and the second window 720 are spaced apart from each other. As the insertion hole 620 is spaced apart from the first opening 610, the first window 710 does not need to cover the insertion hole 620 corresponding to the illuminance sensor 500, and thus, a size of the first window 710 inserted into the first opening 610 may be reduced.

A first outer flange 630 may protrude continuously or discontinuously outward in the radial direction along an outer circumferential surface of the first cover 600. For example, as shown in FIG. 3, the first outer flange 630 may be formed at the center of the first cover 600 in a thickness direction and may have an annular shape surrounding the outer circumferential surface of the first cover 600.

The first outer flange 630 may form a stepped portion from an outer surface of the first cover 600 to form an area where the first outer flange 630 is mounted with the housing 100. For example, as shown in FIG. 5, in a state where the first cover 600 is mounted on the housing 100, an inner side of the first cover 600 with respect to the first outer flange 630 may be inserted into the housing 100. An inner surface of the first outer flange 630 may contact the outer end of the housing 100. A plurality of coupling holes may be formed in an outer surface of the first outer flange 630 and screws may be inserted into the plurality of coupling holes to be coupled to the first cover 600.

A first inner flange 640 may protrude continuously or discontinuously inward in the radial direction along an inner circumferential surface of the first opening 610. For example, as shown in FIG. 3, the first inner flange 640 may be formed inside the first cover 600 in the thickness direction. The first inner flange 640 may form a stepped portion from an outer surface (e.g., a left surface or a front surface of FIG. 5) of the first cover 600 and a mounting surface 641 on which the second cover 800 is mounted may be formed on a front surface. For example, as shown in FIG. 6, in a state where the second cover 800 is mounted on the first cover 600, the first inner flange 640 may contact a second outer flange 830 of the second cover 800. The first cover 600 and the second cover 800 may be inserted into each other or may be coupled to each other through an adhesive or bolts. The second cover 800 may be inserted into the first opening 610 from the outside toward the inside (e.g., from an outer end toward an inner end in the longitudinal direction of the camera apparatus 10) so that the second outer flange 830 is mounted on the mounting surface 641 of the first inner flange 640.

An insertion flange 650 may protrude continuously or discontinuously inward in a radial direction of the insertion hole 620 along an inner circumferential surface of the insertion hole 620. The insertion flange 650 may form a stepped portion from the outer surface (front surface) of the first cover 600 and a mounting surface 651 on which the second window 720 is mounted may be formed on a front surface. For example, as shown in FIG. 7, in a state where the second window 720 is mounted on the first cover 600, the insertion flange 650 may contact a mounting flange 721 of the second window 720. The insertion flange 650 and the second window 720 may be inserted into each other or may be coupled to each other through an adhesive or bolts.

The first window 710 may be mounted in a second opening 810 of the second cover 800 and may transmit light reflected from a subject to the lens 200. The first window 710 may have a shape, such as a circular shape, corresponding to the second opening 810. However, the first window 710 may have a size and a shape corresponding to the second opening 810 and may have any of various shapes such as an elliptical shape or a quadrangular shape but is not limited thereto.

The first window 710 may be located in front of the lens 200 to correspond to the lens 200 and may be spaced apart from the lens 200. The first window 710 may be inserted between support flanges 840 of the second cover 800 and may be supported by a second inner flange 820 so as not to be separated from the second cover 800. For example, the first window 710 may be formed of a material through which both visible light and infrared light may be transmitted. For example, the first window 710 may include optical glass or plastic. For example, the first window 710 may include at least one of glass, polycarbonate (PC), and polymethyl methacrylate (PMMA). Alternatively, the first window 710 may include a material having excellent optical properties.

A diameter of the first window 710 may correspond to an angle of view of the lens 200 (or an angle of view of the camera apparatus 10). For example, the first window 710 may have a diameter corresponding to a maximum angle of view of the lens 200, by considering a change in an angle of view according to a zoom operation of the lens 200. Also, the first window 710 may not overlap the second window 720.

An outer edge of the first window 710 may be covered by the second inner flange 820. For example, as shown in FIG. 6, in a state where the first window 710 is inserted into the second cover 800, the second inner flange 820 may be located in front of the first window 710 to cover the outer edge of the first window 710. Accordingly, the first window 710 may be located at a more inner position than an outer end of the second cover 800 and may be supported and protected by the second inner flange 820. A remaining portion of the first window 720 other than the outer edge covered by the second inner flange 820 may correspond to an angle of view of the lens 200.

The first window 710 may be located at a more inner position than the first cover 600. For example, as shown in FIG. 6, an outer end of the first window 710 may be spaced inward by a length L3 from an outer end of the first cover

600. Accordingly, a portion of the first window 710 exposed outside the housing 100 or the first cover 600 may be minimized, thereby improving the durability of the first window 710 and stably supporting the first window 710.

The second window 720 may be mounted in the insertion hole 620 of the first cover 600 and may transmit light reflected from a subject to the illuminance sensor 500. The second window 720 may have a shape, such as a circular shape, corresponding to the insertion hole 620. The second window 720 may be mounted in front of the illuminance sensor 500 to correspond to the illuminance sensor 500 and may be mounted on the first cover 600. For example, the second window 720 may be mounted on the mounting surface 651 of the insertion flange 650.

The second window 720 may include the mounting flange 721. For example, as shown in FIG. 7, the mounting flange 721 may protrude continuously or discontinuously outward in a radial direction along an outer circumferential surface of the second window 720. In a state where the second window 720 is inserted into the insertion hole 620, the mounting flange 721 may be supported by contacting the mounting surface 651 of the insertion flange 650.

The second window 720 may be formed of a material that may transmit visible light and infrared light or a material that transmits only visible light and blocks infrared light. For example, the second window 720 may include plastic (e.g., plastic for injection). For example, the second window 720 may include at least one of PC, PMMA, and acrylonitrile butadiene styrene copolymer (ABS). Alternatively, the second window 720 may include a material having excellent formability.

The first window 710 and the second window 720 may be separate members. That is, the first window 710 and the second window 720 may be different members rather than one body or piece and may be spaced apart from each other on the first cover 600. For example, the first window 710 may be mounted at one position in the center of a front surface of the first cover 600, and the second window 720 may be spaced outward from the first window 710 in the radial direction of the first cover 600 and may be mounted at a different position on the front surface of the first cover 600. The first window 710 and the second window 720 may be formed of the same material or different materials. For example, the first window 710 may be formed of optical glass, and the second window 720 may be formed of a kind of injection plastic (e.g., at least one of PC, PMMA, and ABS resin.

The second cover 800 may block light emitted from the light source 400 so that the light emitted from the light source 400 is not diffusely reflected within the camera apparatus 10, and may support the first window 710. For example, as shown in FIGS. 1 and 5, the second cover 800 may be inserted into the first opening 610 of the first cover 600 to surround a part of the outer end of the lens 200. For example, the second cover 800 may be formed of a material that blocks both visible light and infrared light.

The inner end of the second cover 800 may extend longer inward than the inner end of the first cover 600. For example, as shown in FIG. 6, the inner end of the second cover 800 may extend longer inward by a length L1 than the inner end of the first cover 600. Accordingly, the inner end of the second cover 800 may be closer to the support substrate 300 than the inner end of the first cover 600. Light emitted from the light source 400 may be more reliably blocked from being directly incident on the lens 200.

The second opening 810 of the second cover 800 may correspond to the lens 200, and external visible light may be incident on the lens 200 through the first window 710 mounted in the second opening 810. For example, the second opening 810 may be spaced apart from a front end of the lens 200. The second cover 800 may have an annular shape around the second opening 810 and may be coaxial with the first cover 600. The plurality of light sources 400 may be arranged outside the second cover 800.

The second inner flange 820 may protrude continuously or discontinuously inward in the radial direction along an inner circumferential surface of the second opening 810. For example, as shown in FIGS. 4 and 6, the second inner flange 820 may be formed on the outer end of the second cover 800 to form an area supporting the first window 710. The second inner flange 820 may extend by being inclined radially inward and toward the lens 200. For example, as shown in FIG. 6, the second inner flange 820 may include an inclined surface 821 on an outer surface.

The second outer flange 830 may protrude continuously or discontinuously outward in the radial direction along an outer circumferential surface of the second cover 800. For example, as shown in FIGS. 4 and 6, the second outer flange 830 may be formed on the outer end of the second cover 800 to be opposite to the second inner flange 820, and may contact the first inner flange 640 in a state where the second cover 800 is inserted into the first cover 600. An inner surface of the second outer flange 830 may contact the mounting surface 641 of the first inner flange 640.

The second outer flange 830 may have a thickness L2. The thickness L2 may be greater than the length L3 between the mounting surface 641 of the first inner flange 640 and the outer surface of the first cover 600. Accordingly, as shown in FIG. 6, a part of the second outer flange 830 may protrude outside the mounting surface 641, and a user may easily separate the second cover 800 from the first cover 600 when necessary.

The support flange 840 may protrude continuously or discontinuously inward in the radial direction along an inner circumferential surface of the second cover 800. For example, as shown in FIG. 6, the support flange 840 may be located at a more inner position than the second inner flange 820 to support an outer circumferential surface of the first window 710. The first window 710 may be firmly supported by the second cover 800 by contacting the support flange 840 and having an outer surface contacting an inner surface of the second inner flange 820.

The controller 900 may be located inside or outside the housing 100 to control other elements of the camera apparatus 10. According to one or more embodiments, the controller 900 is located inside the housing 100 to control the lens 200, the light source 400, and the illuminance sensor 500. The controller 900 may control an photographing operation and a zoom operation of the lens 200 and may individually control the intensity and power of the plurality of light sources 400. Also, the controller 900 may receive an illuminance measured by the illuminance sensor 500 and may turn on the light source 400 when the illuminance is equal to or less than a preset value. Also, when the illuminance is greater than the preset value, the controller 900 may turn off the light source 400.

According to one or more embodiments, the controller 900 may use a direct circuit structure, such as a memory, a processor, a logic circuit, a look-up table, etc. that may execute the respective control functions through controls of one or more microprocessors or other control apparatuses. According to an embodiment, the controller 900 may be specifically embodied by a module, a program, or a part of code, which contains one or more executable instructions for performing specified logic functions, and executed by one or more microprocessors or other control apparatuses. Further, the controller 900 may include or may be implemented by a processor such as a central processing (CPU) that performs the respective functions, a microprocessor, or the like, according to one or more embodiments. The communication module 900 include any one or any combination of a digital modem, a radio frequency (RF) modem, an antenna circuit, a WiFi chip, and related software and/or firmware.

Figure 8:
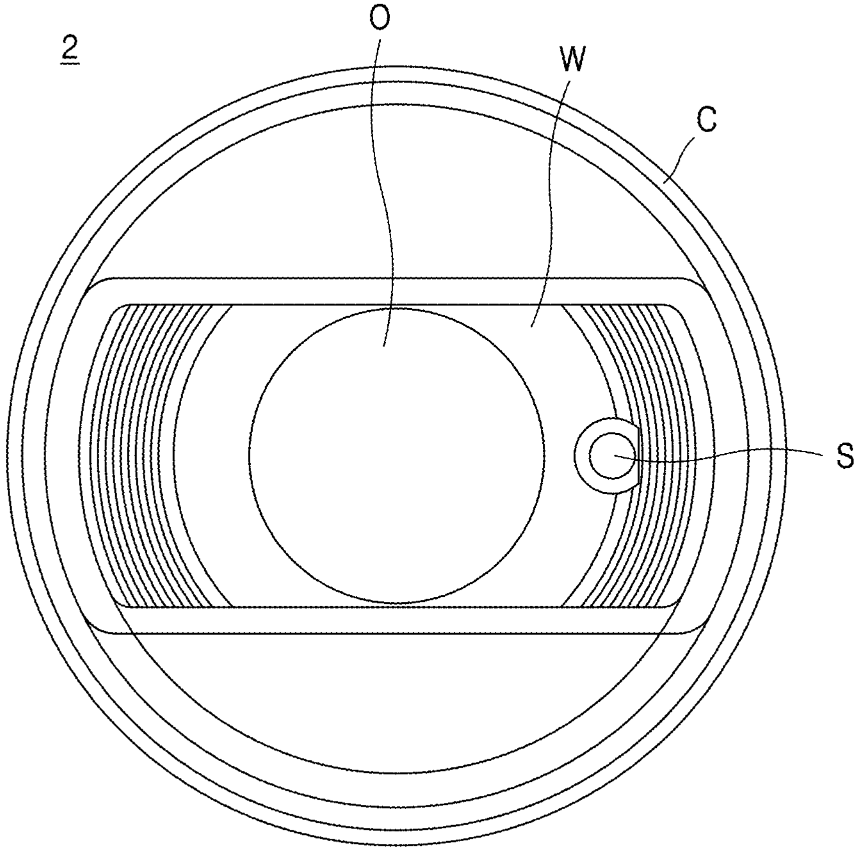
FIG. 8 is a view illustrating a part of a conventional camera apparatus.

FIG. 8 is a front view illustrating a part of a conventional camera apparatus 2. The conventional camera apparatus 2 includes a window W having an opening O, a cover C located behind the window W, and an illuminance sensor S located on the cover C. As shown in FIG. 8, the window W of the conventional camera apparatus 2 is located on a front surface of the conventional camera apparatus 2 so that the opening O corresponds to a lens. Also, the illuminance sensor S is also located to correspond to the window W in order to receive visible light to measure an illuminance. Accordingly, the size of the window W is inevitably increased so that the window W covers the illuminance sensor S.

Also, in the conventional camera apparatus 2, a light source may not be arranged in an area around the opening O covered by the window W (i.e., the light source is arranged only in upper and lower portions of the cover C not covered by the window W in FIG. 8). Accordingly, the number of light sources that may be installed may be small, thereby reducing the performance of the conventional camera apparatus 2.

On the other hand, as described above, in the camera apparatus 10, the first cover 600 may include the first opening 610 and the insertion hole 620 separated from each other, and the first window 710 and the second window 720 may be spaced apart from each other to respectively correspond to the first opening 610 and the insertion hole 620. Accordingly, a size of the first window 710 may be minimized to correspond to an angle of view of the lens 200, without having to increase the size to cover not only the lens 200 but also the illuminance sensor 500. Accordingly, a size of the first window 710 may be greatly reduced, compared to a conventional camera. Also, because a size of the first window 710 required to have excellent optical properties to prevent distortion of light incident on the lens 200 may be reduced in size, costs required to manufacture the camera apparatus 10 may be reduced and economic efficiency may be improved. Also, the illuminance sensor 500 may be covered by the second window 720 separate from the first window 710, and the second window 720 may be formed of any material as long as relatively minimal formability is ensured.

Also, in the camera apparatus 10, because a size of the first window 710 is reduced, a plurality of light sources 400 may be arranged throughout the area of the first cover 600 not overlapping the first window 710. Accordingly, because the number of light sources 400 that may be mounted on the support substrate 300 is increased, the performance of the camera apparatus 10 may be improved.

According to one or more embodiments, because a window through which visible light is transmitted and a window covering an illuminance sensor are separated from each other, a size of the window through which visible light is transmitted may be reduced, thereby configuring a camera apparatus to be compact.

However, technical effects of the disclosure are not limited thereto, and other unmentioned technical effects will be apparent to one of ordinary skill in the art from the following description.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. A camera apparatus comprising:
- a housing;
- a lens included in the housing;
- a plurality of light sources arranged around the lens;
- an illuminance sensor;
- a first cover covering an end of the lens;
- a first window mounted on the first cover corresponding to the lens; and
- a second window mounted on the first cover corresponding to the illuminance sensor,
- wherein the first cover comprises:
  - a first opening located in a center of the first cover and configured to allow the first window to be mounted therein; and
  - an insertion hole located outside the first opening in a radial direction of the first cover and configured to allow the second window to be mounted therein,
- wherein the camera apparatus further comprises:
  - a second cover mounted on the first cover and comprising a second opening in which the first window is mounted, and
- wherein the second cover is located closer to the center of the first cover than the plurality of light sources in the radial direction of the first cover.

2. The camera apparatus of claim 1, wherein the first window and the second window are separate and spaced apart from each other on a front surface of the first cover.

3. The camera apparatus of claim 1, wherein the first opening has a diameter greater than a diameter of the lens.

4. The camera apparatus of claim 3, wherein the second window comprises a mounting flange protruding along an outer circumferential surface of the second window,
- wherein the insertion hole comprises an insertion flange protruding along an inner circumferential surface of the insertion hole, and
- wherein, in a state in which the second window is inserted into the insertion hole, a front surface of the first cover protrudes, in a forward direction, to a front surface of the second window or beyond the front surface of the second window.

5. The camera apparatus of claim 1, wherein the plurality of light sources and the illuminance sensor are arranged outside the first window in a radial direction.

6. The camera apparatus of claim 3, further comprising:
- a support substrate mounted on an outer circumferential surface of the lens and configured to allow the plurality of light sources and the illuminance sensor to be mounted thereon.

7. The camera apparatus of claim 6, wherein the support substrate is spaced apart in a longitudinal direction of the housing from an inner end of the first cover and an inner end of the second cover.

8. The camera apparatus of claim 6, wherein the first cover further comprises:

a first inner flange protruding along an inner circumferential surface of the first opening and configured to support the second cover;

an insertion flange protruding along an inner circumferential surface of the insertion hole and configured to support the second window; and a first outer flange protruding along an outer circumferential surface of the first cover and contacting an end of the housing.

9. The camera apparatus of claim 8, wherein the second cover further comprises:

a second outer flange supported by the first inner flange and protruding along an outer circumferential surface of the second cover;

a second inner flange protruding along an inner circumferential surface of the second opening; and a support flange located behind the second inner flange, protruding along the inner circumferential surface of the second opening, and configured to support an outer circumferential surface of the second window.

10. The camera apparatus of claim 6, wherein the first cover is configured to block visible light and transmit infrared light, and wherein the second cover is configured to block visible light and infrared light.

11. The camera apparatus of claim 1, wherein a diameter of the first window corresponds to an angle of view of the lens, and wherein the first window is offset from the second window.

12. The camera apparatus of claim 1, wherein the first window comprises at least one of glass, polycarbonate (PC), or polymethyl methacrylate (PMMA).

13. The camera apparatus of claim 1, wherein the second window comprises at least one of PC, PMMA, or acrylonitrile butadiene styrene copolymer (ABS) resin.

14. The camera apparatus of claim 1, wherein the first window and the second window comprise different materials.

15. The camera apparatus of claim 14, wherein the first window comprises optical glass and the second window comprises injection plastic.

16. The camera apparatus of claim 1, wherein the first window is configured to transmit visible light and infrared light.

17. The camera apparatus of claim 1, wherein the second window is configured to transmit visible light and infrared light or configured to transmit only visible light and block infrared light.

18. The camera apparatus of claim 1, wherein the illuminance sensor is located between the plurality of light sources.

19. The camera apparatus of claim 1, wherein the first cover and the first window are arranged concentrically, wherein the first cover has a diameter greater than a diameter of the first window, and wherein the plurality of light sources are located in a circular formation between the first cover and the first window.

20. A camera apparatus comprising:

a housing;

a lens included in the housing;

a support substrate connected to the lens;

a plurality of infrared light sources mounted on a front surface of the support substrate and arranged around the lens;

an illuminance sensor mounted on the front surface of the support substrate and located between the plurality of infrared light sources;

a first cover covering an end of the lens, comprising a first opening in a center thereof and an insertion hole at a position spaced apart from the first opening in a radial direction, the first cover being configured to block visible light and transmit infrared light;

a first window mounted in the first opening corresponding to the lens and offset from the plurality of infrared light sources, the first window being configured to transmit visible light and infrared light;

a second window mounted in the insertion hole corresponding to the illuminance sensor, formed of a material different from a material of the first window, the second window being configured to transmit visible light and infrared light or configured to transmit only visible light and block infrared light; and a second cover mounted on the first cover, located closer to the center of the first cover than the plurality of infrared light sources in the radial direction of the first cover, the second cover being configured to support the first window and to block visible light and infrared light.

* * * * *